US007440123B2

(12) United States Patent
Chodagiri et al.

(10) Patent No.: US 7,440,123 B2
(45) Date of Patent: Oct. 21, 2008

(54) ADAPTIVE PRINTING

(75) Inventors: Syam Chodagiri, Rochester, NY (US); Nader Anvari, Rochester, NY (US); James M. Enge, Spencerport, NY (US); Jason C. Van Blargan, Scottsville, NY (US); Peter Rudak, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 567 days.

(21) Appl. No.: 11/185,392

(22) Filed: Jul. 20, 2005

(65) Prior Publication Data

US 2007/0019216 A1 Jan. 25, 2007

(51) Int. Cl.

| | |
|---|---|
| ***G06F 15/00*** | (2006.01) |
| ***G06F 3/12*** | (2006.01) |
| ***G06K 1/00*** | (2006.01) |
| *G06K 15/00* | (2006.01) |

(52) U.S. Cl. .................................... 358/1.13; 358/1.18

(58) Field of Classification Search .................. 358/1.1, 358/1.18, 1.14, 1.13, 1.15, 1.6, 3.26
See application file for complete search history.

(56) References Cited

U.S. PATENT DOCUMENTS

| | | | | |
|---|---|---|---|---|
| 6,452,615 | B1 | 9/2002 | Chiu et al. | |
| 6,636,332 | B1 * | 10/2003 | Soscia | 358/401 |
| 6,707,931 | B2 | 3/2004 | Herbert | |
| 6,765,691 | B2 * | 7/2004 | Kubo et al. | 358/1.9 |
| 6,801,907 | B1 * | 10/2004 | Zagami | 707/3 |
| 2001/0048529 | A1 | 12/2001 | Fotland | |
| 2002/0176103 | A1 | 11/2002 | Geissler et al. | |
| 2004/0141192 | A1 | 7/2004 | Jodra et al. | |
| 2006/0230358 | A1 | 12/2006 | Sacher et al. | |

FOREIGN PATENT DOCUMENTS

| | | |
|---|---|---|
| WO | 01/77992 | 10/2001 |
| WO | 02/100644 | 12/2002 |
| WO | 2004/096547 | 11/2004 |

* cited by examiner

*Primary Examiner*—Douglas Q Tran
(74) *Attorney, Agent, or Firm*—Roland R. Schindler, II

(57) ABSTRACT

Methods and systems for printing an image on a receiver medium are provided. In accordance with the method, digital image data representing an image to be printed is received and, a print engine is used to print an image on the receiver medium based upon the digital image data and initial printing settings. A press sheet image is captured of the image printed on the receiver medium and, the press sheet image is automatically compared to the digital image data to detect differences. Selected types of differences can be identified or can be addressed by adapting the press sheet image or adjusting digital image data prior to comparison.

20 Claims, 5 Drawing Sheets

ADAPTIVE PRINTING

FIELD OF THE INVENTION

The present invention relates to proofing systems and more particularly to novel methods for providing press sheets for use in proofing.

BACKGROUND OF THE INVENTION

In the printing industry, it is common to provide a physical sample of a printed image to a client for approval prior to printing a large number of copies of the image. One type of sample print is known in the industry as a press sheet. The press sheet is an image printed by a printer that will be used to print the large number of copies of a printed output. The press sheet is evaluated by the client and/or the printer to determine whether the printer is set up to print an output that has a desirable/acceptable appearance. One limitation of this process is that the client and/or printer must physically review the press sheet to make this determination. However, it is often difficult to present such a press sheet to a client, particularly, when a great distance separates the printer and the client. Further, it is expensive to print one press sheet or a small number of press sheets using high volume output devices of the type used to print large quantities of an image.

Alternatively, a physical sample can be provided in the form of a proof. A proof is an image printed by a printer other than the high volume output device and is intended to have an appearance that matches the appearance of a printed output of the same image as printed by the high volume output device. Typically, such proofs are printed by digital color printers. Such digital color printers print color prints of images that have been encoded in the form of digital data. This digital data includes code values indicating the colors to be printed in an image. When a digital color printer generates the printed output of an image, it is intended that the image recorded on the printed output will contain the exact colors called for by the code values in the digitally encoded data. In theory, such an image should also have an appearance that matches the appearance of the image printed by a high volume output device.

However, in practice, it has been found that the colors in the images printed by digital color printers do not always match the colors printed by high volume output devices. Such color variations can be caused by difference in the ink/toner, substrate/paper and printing techniques used in the digital printer and in the high-volume output device. Accordingly, special digital color printers have been developed that can be color adjusted so that they can mimic the performance of high volume output devices. Such specially adjusted color printers are known in the industry as "proofers". An example of such "proofer" is the Approval NX Digital Halftone Proofing System developed and manufactured by Kodak and sold by Kodak Polychrome Graphics, Rochester, N.Y., U.S.A. The Approval NX Digital Halftone Proofing System is specially designed so that it prints images that have an appearance that precisely mimics the appearance of a digital image that will be printed using a high volume output device using agreed upon settings. In this way, a consumer can be provided with a proof that reliably represents the appearance of the same image, as it will appear when printed by a high volume output device.

It will be appreciated however that this system, while commercially successful and highly valuable, does not enable a consumer to evaluate an actual image printed by the actual high volume printer that will print the job. Accordingly, dayto-day variations that might arise in the operation of such a high volume printer are not always accounted for. Further, this also requires that the proof printed by the proofer is manually delivered to the consumer for evaluation and that the consumer manually provide some form of authorization in response thereto. This can introduce the risk of unnecessary delays and communication errors. These factors can also lead to consumer dissatisfaction and extra expenses.

One approach to solving this problem is described in U.S. Pat. No. 6,707,931, entitled "Remote Print Press Proofing System" filed by Herbert on Apr. 26, 2002. In the '931 patent, a system for image sharing is described that has two embodiments. In one embodiment, a physical sample is printed by the high volume output device, removed therefrom, and taken to a digitizing device which can be a scanner, camera, camera scan back, or other digitizer. For example, FIG. 1 of the '931 patent provides a digitizer in the form of a stand-alone flat bed scanner that is a component of a scanning and image sharing system. The scanning and image sharing system is adapted to color correct the scanned image and to share the scanned image with a remote display device to allow a remote user to determine whether the physical sample has a desirable appearance. In the first example of the '931 patent, the user manually reviews the image and provides audio or verbal feedback to the printer who makes modifications to the digital image and provides a revised digital image to the consumer for review. Thus, in this approach, the consumer cannot judge the actual impact that the requested changes will have on the printed image.

In an alternative approach described in the '931 patent, the remote user is provided with an electronic image that is intended to represent what will be printed by the high volume printer based upon known color printing characteristics of the high volume printer. When the electronic image is transmitted to a remote user for presentation on a soft display, such as a CRT or LCD, the image is color corrected so that the image presented to the remote user has an appearance that corresponds to the predicted appearance of the image as it will be printed by the high-volume printer. If the remote user desires changes, the remote user can send signals to the image server requesting such changes and the remote server will simulate the effects of such changes and return a second electronic image to the remote user. This process can be iteratively repeated allowing the remote user to make any number of modifications to the image. When the user transmits an acceptance, the printing device will then print an image in accordance with the electronic image.

A central limitation of such a system is that it requires visual analysis of each image by a user and, of course, such analysis can be subject to human error. A further central limitation of such systems is that there is no inherent integration between the operation of the press and the scanning, evaluation, and feedback process, thus increasing the amount of time required to generate, share, evaluate, and make changes to a press sheet and to make corrections, or adjustments to the operation of the press of the '931 patent.

Accordingly, what is needed in the art is a more integrated system that enables rapid, accurate and automatic evaluation of an image printed by a high-volume output device to facilitate the process of detecting conditions in the printed image that do not conform to conditions called for by data in digital image data upon which the printed image is based that are of interest, so that proper adjustments can be made in the operation of the high-volume output device in a cost efficient and timely fashion.

SUMMARY OF THE INVENTION

Figure 1:
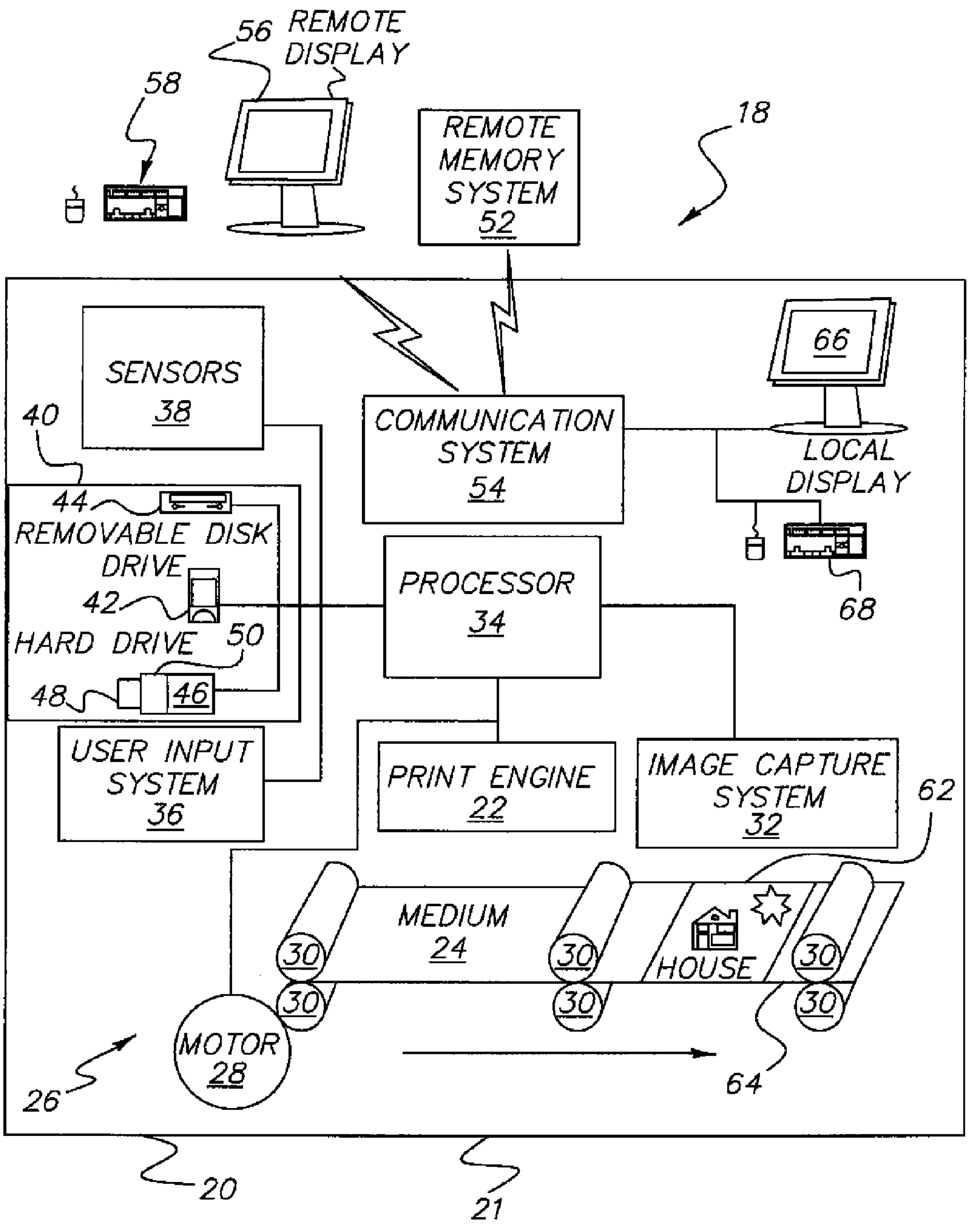
FIG. 1 shows a first embodiment of a printing/proofing system arrangement.

In one aspect of the invention, a method for printing an image on a receiver medium is provided. In accordance with the method digital image data representing an image to be printed is received and a print engine is used to print an image on the receiver medium based upon the digital image data and initial printing settings. A press sheet image is captured of the image printed on the receiver medium and a virtual press sheet image is generated based upon the press sheet image said generating including the step of adapting the press sheet image to remove any artifacts induced by the manner in which the press sheet image is captured. The digital image data to form a virtual proof image having an appearance that reflects the anticipated appearance of an image printed on the receiver medium by the print engine based upon the digital image data and, automatically comparing the appearance of the virtual press sheet image and the appearance of the virtual proof image to detect differences.

In another aspect of the invention, a method for printing an image on a receiver medium is provided. In accordance with the method, digital image data representing an image to be printed is received and, a print engine is used to print an image on the receiver medium based upon the digital image data and initial printing settings. A press sheet image is captured of the image printed on the receiver medium and the press sheet image is automatically compared to the digital image data to detect differences between the appearance of the image represented by the digital image data and the appearance of the press sheet image. Differences are identified that reflect at least one of the presence of an image artifact introduced by the process used to capture the press sheet image, any detected difference introduced by the way in which a properly operating print engine converts digital image data into a printed image on a reference receiver medium or any detected difference introduced by a difference in the way in which a particular type of receiver medium responds to printing by the print engine and the way in which the reference receiver medium reacts to the same printing by the print engine. An output signal is generated based upon the detected differences and the identified differences.

In still another aspect of the invention, a system for printing images on a receiver medium is provided. The system comprises: a print engine to print an image on the receiver medium based upon digital image data, said printing being performed in accordance with initial printing settings; an image capture system adapted to capture a digital image of the receiver medium after an image has been printed thereon, and to generate captured image data reflecting the appearance of the image on the receiver medium; a processor adapted to cause the print engine to print the image on the receiver medium, to cause the image capture system to capture an image of the press sheet, and to convert captured image data into a virtual press sheet image by adapting captured image data to remove any artifacts introduced by the image capture system; a source of a virtual proof, said virtual proof being formed by adapting the digital image data to reflect known characteristics of the way in which the print engine converts digital image data into images to be formed on a receiver medium and by further adapting the digital image data to reflect known characteristics of a receiver medium upon which a press sheet is to be printed using the digital image data; and a comparator adapted to compare the appearance of virtual press sheet image and the appearance of virtual proof image to detect differences therebetween.

DETAILED DESCRIPTION OF THE INVENTION

FIG. 1 shows a first embodiment of a printer 20 of the invention. In the embodiment of FIG. 1, printer 20 comprises a housing 21 having a print engine 22 that applies markings or otherwise forms an image on a receiver medium 24. Print engine 22 can record images on receiver medium 24 using a variety of known technologies including, but not limited to, conventional four color offset separation printing or other contact printing, silk screening, dry electrophotography such as is used in the NexPress 2100 printer sold by Eastman Kodak Company, Rochester, N.Y., USA, thermal printing technology, drop on demand ink jet technology and continuous inkjet technology. For the purpose of the following discussions, print engine 22 will be described as being of a type that generates color images. However, it will be appreciated that this is not necessary and that the claimed methods and apparatuses herein can be practiced with a print engine 22, monotone images such as black and white, grayscale or sepia toned images.

A medium advance 26 is used to position a receiver medium 24 and/or print engine 22 relative to each other to facilitate recording of an image on receiver medium 24. Medium advance 26 can comprise any number of well-known systems for moving receiver medium 24 within printer 20, including motor 28 driving pinch rollers 30, a motorized platen roller (not shown) or other well-known systems for the movement of paper or other types of receiver medium 24. Medium advance 26 is also used to position a receiver medium 24 relative to an image capture system 32 after an image has been printed on the receiver medium 24 by print engine 22.

Print engine 22, medium advance 26 and image capture system 32 are operated by a processor 34. Processor 34 can include but is not limited to a programmable digital computer, a programmable microprocessor, a programmable logic processor, a series of electronic circuits, a series of electronic circuits reduced to the form of an integrated circuit, or a series of discrete components. Processor 34 operates printer 20 based upon input signals from a user input system 36, sensors 38, a memory 40 and a communication system 54.

User input system 36 can comprise any form of transducer or other device capable of receiving an input from a user and converting this input into a form that can be used by processor 34. For example, user input system 36 can comprise a touch screen input, a touch pad input, a 4-way switch, a 6-way switch, an 8-way switch, a stylus system, a trackball system, a joystick system, a voice recognition system, a gesture recognition system or other such systems.

Sensors 38 are optional and can include light sensors and other sensors known in the art that can be used to detect conditions in the environment surrounding image capture system 32 and to convert this information into a form that can be used by processor 34 in governing operation of print engine 22, image capture system 32 and/or other systems of print 20. Sensors 38 can include audio sensors adapted to capture sounds. Sensors 38 can also include positioning and other sensors used internally to control printer operations.

Memory 40 can include conventional memory devices including solid state, magnetic, optical or other data storage devices. Memory 40 can be fixed within printer 20 or it can be removable. In the embodiment of FIG. 1, printer 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including but not limited to control programs, digital images and metadata can also be stored in a remote memory system 52 that is external to image capture system 32 such as a personal computer, computer network or other digital system.

Figure 2:
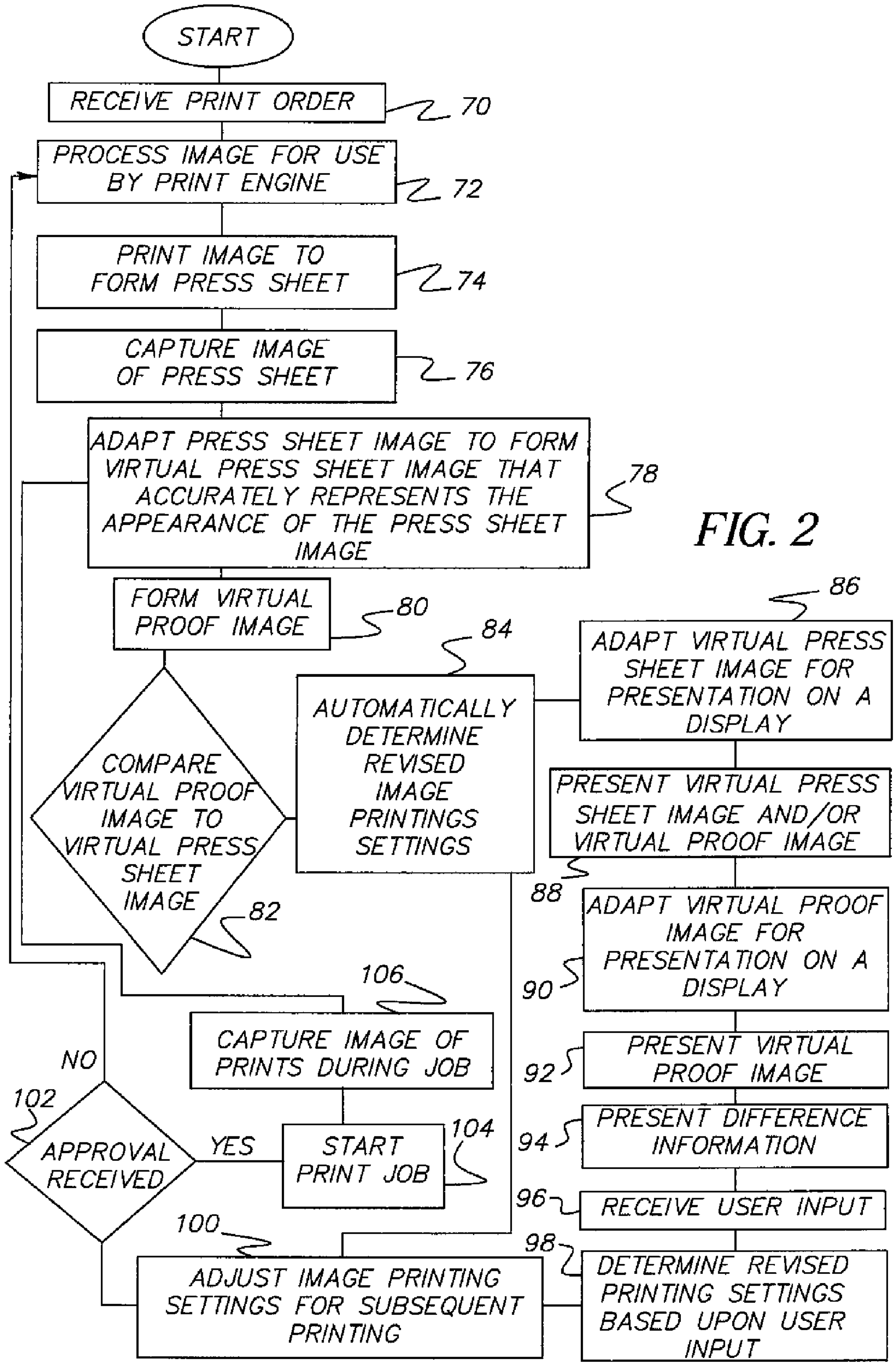
FIG. 2 shows a flow diagram of a method for operating a printing system in accordance with the invention.

In the embodiment shown in FIGS. 1 and 2, printer 20 has a communication system 54 for communicating with a remote memory system 52, a remote display 56, remote input 58, local display 66, and/or a local input 68. Communication system 54 can be for example, an optical, radio frequency or transducer circuit or other system that converts image and other data into a form that can be conveyed to a remote device such as remote memory system 52 or remote display device 56 by way of an optical signal, radio frequency signal or other form of signal. Communication system 54 can also be used to receive a digital image and other information from a host computer or network (not shown). Communication system 54 provides processor 34 with information and instructions from signals received thereby.

It will be appreciated that, in other embodiments, local display 66 can communicate with processor 34 without involvement of communication system 54. Similarly, local input 68 can be a component of user input system 36 and can also provide signals to processor 34 without involvement of communication system 54.

FIG. 2 provides a flow diagram showing one embodiment of a method for operating printer 20 of FIG. 1. As is shown in the embodiment of FIG. 2, a print order is received by printer 20 (step 70) providing instructions sufficient for processor 34 to begin a print sequence. Processor 34 can receive a print order in a variety of ways including but not limited to a receiving entries made at user input system 36, signals received at communication system 54, or in response to data provided by way of memory 40 including but not limited to data provided by way of a removable memory card 48.

Each print order generally provides information from which processor 34 can determine what image is to be printed, how the image is to be printed and the quantity of the images that are to be printed. The typical print order will provide digital image data representing the image to be printed, however, the job order may include more. Processor 34 then begins to process the digital image data by converting the digital image data into a form that can be used by print engine 22 (step 72). This typically involves converting the digital image data into code values (or other data types) that represent specific colors to be printed on receiver medium 26 to form an image.

A press sheet 64 is then formed by printing a press sheet image 62 on receiver medium 24 (step 74) using initial printing settings. Generally, such printing settings can help to govern the way in which print engine 22 converts code values into colors in an image, or other aspects of the printing process, such as printing speed. However, such printing settings can also dictate aspects of maintenance of the printing process, such as when and how print engine 22 is to be adjusted and/or maintained. In the embodiment of FIG. 2, the printing settings provide information that processor 34 uses when processor 34 operates medium advance 26 and provides code values to print engine 22 from which print engine 22 can determine colors that are to be printed at particular locations on receiver medium 24 to form press sheet image 62.

Processor 34 then operates medium advance 26 to move press sheet 64 to a position where press sheet 64 confronts image capture system 32 so that image capture system 32 can capture an electronic image of press sheet 64. Processor 34 then causes an image to be captured of press sheet 64 in the form of image data representing the appearance of image 62 on press sheet 64 (step 76). It will be appreciated that image capture system 32 can comprise any of a number of conventional image capture sensors (not shown) and associated control and image processing circuits that are adapted to sense a pattern of light reflected or passed through receiver medium 24. In this regard, image capture system 32 can comprise a charge couple device (CCD), a complimentary metal oxide sensor (CMOS), or any other electronic image sensor known to those of ordinary skill in the art.

In the embodiment of FIG. 1, image capture system 32 comprises a Time Delay Integration (TDI) camera. The TDI camera allows asymmetrical sampling of press sheet image 62 and, optionally, anything else recorded on press sheet 64 with integration of image data in a direction of movement of receiver medium 24 to allow real-time image capture of a series of separate images printed on a receiver medium 24 moving past TDI camera at rates of 30 meters per second or more at full press operating speeds with improved color accuracy results. In other embodiments of the invention, image capture system 32 can comprise a non-TDI line camera used to obtain the image of press sheet 64. Conventional two-dimensional array image sensors can also be used for image capture system 32. Image capture system 32 can be positioned and defined to capture a complete image of any image 62 on any press sheet 64.

There are a variety of image capture strategies that can be used to capture image information from press sheet 64. In one embodiment, each press sheet 64 is fully captured at the best available image capture resolution. In other embodiments, images are captured of each press sheet 64, however, certain portions of each press sheet 64 are captured differently. For example, images can be captured of press sheet 64 with certain areas captured greater resolution or with specific image capture goals in mind. In one embodiment of this type, regions of interest (ROI) can be defined within press sheet image 62 and an image captured of press sheet 64 in such regions can be performed in a manner that allows for better discrimination of features therein. This can be done by increasing resolution within such areas or by otherwise altering the scanning process so that a desired level of image detail will be available within the region of interest. In another embodiment, specialized target scanning can be used that defines a special target such as a particular text, image portion or combination of colors that should be found within a region of press sheet image 62, and image capture of that region can be performed with special emphasis to provide a level of image information that is high enough to allow a determination to be made as to whether the target area has an appropriate appearance while also providing less image information captured from other portions of press sheet image 62.

Processor 34 adapts the image of press sheet 64 to form a virtual press sheet image having an appearance that accurately represents the appearance of press sheet 64 (step 78). This step can involve any of a number of adjustments to the captured image of press sheet 64. A principal purpose of such adaptations is to remove any image artifacts induced by the manner by which an electronic image of press sheet 64 is captured. For example, depending on the way in which the press sheet image was captured, it may be necessary to correct the image to compensate for conditions in the image capture system 32, the light used to capture the image, or any number of other factors that can influence the accuracy with which image capture system 32 captures an image of press sheet 64. In particular, it will be appreciated that using certain types of image capture and, in particular, using high-speed line scanning, moiré effects can create significant artifacts that should be addressed. In one embodiment, this problem is addressed by sub-sampling in the direction of travel of receiver medium 24. Such sub-sampling can be performed during capture using a TDI camera or it can be performed during post-capture processing by processor 34.

A virtual proof image is then obtained. In the embodiment of FIG. 2 the virtual proof is formed by color managing and otherwise adjusting the digital image data (step 80) so that the virtual proof image has an appearance that is based upon the colors that print engine 22 has been known to print in response to particular code values on a color neutral reference receiver medium 24 such as a pure white receiver medium 24. The appearance of the virtual proof image can also be based upon any known color interactions between the way in which, for example, a dye, toner, ink, or colorant used by print engine 22 is known to interact with a particular receiver medium 24 used to form colors on receiver medium 24.

Alternatively, the virtual proof can be formed by adapting in like fashion the data transferred from processor 34 to print engine 22 during printing of the press sheet which, as noted above, is ultimately based upon the digital image data.

Similarly, it will be appreciated that print engine 22 and receiver medium 24 can interact in other ways to form an image on receiver medium 24, and that receiver medium 24 can interact with the dye, ink, or other colorant that will be applied by print engine 22 in various ways that will impact the apparent color of the printed image such as where receive medium 24 is adapted to form an image when subject to image exposure to light, heat, impact, or other forms of energy. For example, receiver medium 24 can, itself, be colored and/or textured in ways that will impact apparent color of any dyes, inks, or other colorants applied thereto by print engine 22. Such effects can be anticipated and can be used to modify the digital image data to form a virtual proof image so that a virtual press sheet image and virtual proof image can be compared accurately.

The virtual press sheet image is then automatically compared to the virtual proof image so that any differences between the appearance of the virtual press sheet image (step 82) and the appearance of the virtual proof image can be detected. One or both of the images can be normalized as necessary for this comparison. In one embodiment, this can be done by comparing the data representing the virtual press sheet image to the data representing the virtual proof image. Such comparisons can include comparing the code values in each image to detect any variation in color in the images. Other types of color analysis can be performed, for example, color differences can be detected by comparing colors and print characteristics in the image, such as solid ink density (SID), trapping, dot gain, Lab data, hue, saturation, print contrast, and/or gray balance. Other comparisons could comprise conducting a frequency analysis of the data in the images to identify areas of high-resolution image content and low-resolution image content so that the extent of the sharpness of the image recorded on the press sheet can be verified. Such comparisons can also include comparing the expected content and shapes found in the images so that printing errors, such as failing to update text or printing improperly, can be detected.

The automatic comparison step (step 82) can also be used to detect image artifacts in the virtual press sheet image that are indicative of printing process anomalies including, but not limited to, unintended ink drops, line thickness variations, line sharpness, pin cushion effects, and other variations that can occur in the printing process. Such a comparison can be employed to detect conditions that are specific to certain print engine types. For example, where print engine 22 is an inkjet print engine, comparison of the virtual proof image against the virtual press sheet image can be used to detect image artifacts in the virtual press sheet that are indicative of conditions caused by non-uniform operation of inkjet heads such as:

1. Airflow problems—

Airflow problems can give the appearance of texture, patterning, or "wavy" lines in an area of the virtual press sheet image that are not found in the same area of the virtual proof image. These problems occur when drops of ink "clumping together" in one area and/or spread farther apart in an adjacent area.

2. Dark Defect—

Dark defects appear as regions of the virtual press sheet image that are overly dark following, in print order, a dark region of the virtual press sheet. Such dark defects can be detected quickly by comparison with the virtual proof image.

3. Satellite Drops on Text/Line art—

Satellite drops often create high-density artifacts in a printed image and these are typically caused by extra drops during printing, or possibly drops printing in the wrong place. However, satellite drops differ from dark defect in that they appear around high intensity text or line areas, such as edges where the image changes immediately from at or near 100% to 0% coverage.

4. Pic-Out—

Pic-out problems are caused by the failure of individual drops to print. This is an opposite problem to dark defect. The drops that should have printed pick up some charge from adjacent charged drops, resulting in these drops being caught instead of printed. These anomalies appear in images as lighter or blank regions in what should have been a darker or solid area. Pic-out problems tend to occur most often near borders of coverage regions.

5. Streakers—

Streaker problems typically take the form of a solid or intermittent line of printed ink in the print direction and can occur in any region of an image. These can occur where control of an ink jet nozzle is not adequately managed.

6. Clogged Jets—

Clogged jets fail to print and thus forming a line that is the color of the receiver media in the print direction in regions of an image having some amount of coverage.

7. Crooked Jets—

Crooked jets typically form a line that is the color of the receiver media in the print direction in regions of an image having some amount of coverage. However, a crooked jet will also typically produce a dark line adjacent to the white line where two jets are depositing drops.

8. "Frowning" Serifs—

Frowning serifs appear as horizontally lines with unintended, but significant curvature.

9. Sync Bands—

Banding appearance in the output.

Other problems that can be automatically detected by comparison of the virtual press sheet and virtual proof image include:

1. Density Shifts—

Color variations can occur in ink jet printing when the speed of the receiver medium is not consistent.

2. Print engine Stitching Defect—

Color variations that can occur at a border region between an area printed by a first array of ink jet nozzles in a print engine and an area printed by a second array of ink jet nozzles.

3. Color Mis-registration—

Color variations that occur where the alignment of differently colored inks is not correct.

4. Color-to-Color Bleed—

Color-to-color bleed problems appear at points where different colored regions merge into one another causing fuzzy edges. These problems are caused by excessive ink for a given paper.

Still other conditions that could be detected in one or more embodiments of the invention during the comparison step (step 82) include but are not limited to problems that can arise because of the way in which the printing job has been set up, which yield the following characteristics that can be detected by way of this comparison:

1. Font artifacts—

Font artifacts can take the form of excessively small size, anti-aliasing of text, use of lossy compression on raster text, holes in text caused by ink level & diffusion.

2. Trap Errors—

Trapping is the ability of an ink to transfer equally to unprinted substrate and a previously printed ink film. Unequal transfer caused by trapping can take the appearance of a non-uniform colors in an image.

3. Knockout Errors—

In some types of printing, when one color is to be printed immediately adjacent to another color a region of overlap is defined so as to ensure the continuity of color at the border. Where this is done incorrectly the overlap can create an artifact in the image.

4. Color contamination in highlights and primaries—

Color contamination can take the form of black dots in highlights or primary colors that are not pure.

5. Plugged shadows—

Plugged shadows are found in shadow regions of an image that exhibit a loss of detail and are over-dark or "muddy" looking.

6. Image Sharpness—

Some images may not appear to have sharp edges when printed.

7. Diffusion problems—

Diffusion problems create worming, patterning, and haloing around solid characters in a light background area. Caused by interaction of the diffusion algorithm with certain types of image content.

Revised printing settings can then be optionally determined based upon the detected differences for use in subsequent prints by the print engine (step 84). These revised print settings can be determined automatically based upon the type of difference detected where there are known revisions to image rendering settings that can address to a particular type of difference such as for example, changes to the code values, printing speed or other characteristics of the process of printing an image. In the above-described embodiment, problems can be resolved by automatically adjusting the printing settings.

Some problems may require revised printing settings that cause processor 34 to initiate or request maintenance or service procedures, such as a nozzle cleaning process or that adjust the operation of various nozzles or other printer surfaces to correct for detected problems. Accordingly, as used herein the term printing settings includes data or other electronic signals that can be used to signal a need to initiate such maintenance or service procedures or cause such adjustments to be made to the operation of the nozzles.

Optionally, a client, pressroom manager, or other person can be involved in the process of determining revised printing settings. In the embodiment shown in FIG. 2, this is done by presenting the virtual press sheet image and, optionally, the virtual proof to a user for example, using remote display 56 or local display 66 to present such images.

Where this is done, it is useful to adapt the virtual press sheet image so that the colors in the virtual press sheet image have a displayed appearance that matches the appearance of the colors printed in the press sheet image 62 (step 86). It will be appreciated however, that differences in operating systems, dyes or other colorants used in a display and settings for a display can greatly influence the manner in which the display converts code values into colors. This can cause different displays to present the same image having substantially different colors. Accordingly, a process of color profiling can be performed for each display upon which a virtual press sheet image is to be presented in order to carefully build an association between the colors that the display generates in response to selected code values. By adapting the virtual press sheet image using such color profiling a virtual press sheet image can be formed that, when presented on the display, has colors that have the same appearance as colors on the press sheet. Where a virtual press sheet is to be presented on more than one display, such as where the virtual press sheet is transmitted to multiple users for review, each display can be separately profiled with the separate profiles for each display being used to form a version of the virtual press sheet image adapted for presentation on the display. In this way, each display receives a virtual press sheet image that will accurately represent the appearance of the printed press sheet 64 when presented on the display.

In certain embodiments, printer 20 is adapted for use with a class of displays that are certified to operate within a range of parameters so that only one version of the virtual press sheet image need be generated with that version being shared with any of the displays of the class. In other cases, the printer has profiles for more than one display type stored in memory 40, with processor 34 determining a display type and forming a variety of virtual press sheet images for distribution, with each virtual press sheet being adapted for presentation according to the display profile for the display to which the image is being sent.

Each virtual press sheet image is then transmitted to the one or more display (e.g. remote display 56 or local display 66) for which the virtual press sheet image has been adapted and is then presented thereon (step 88).

Similarly, the virtual proof image can also be adapted for presentation on a display for comparison with the virtual press sheet image 62, such as remote display device 56 or local display device 66 as is described above (step 90) and provided to the display for presentation thereon (step 92). Depending on the preferences of the reviewer(s) the virtual proof can be presented for side-by-side comparison with the virtual press sheet. Alternatively, the virtual proof can be available for alternate presentation with the virtual press sheet, superimposed presentation or other comparative presentation with the virtual press sheet image in a manner that is useful for a user.

Figure 3:
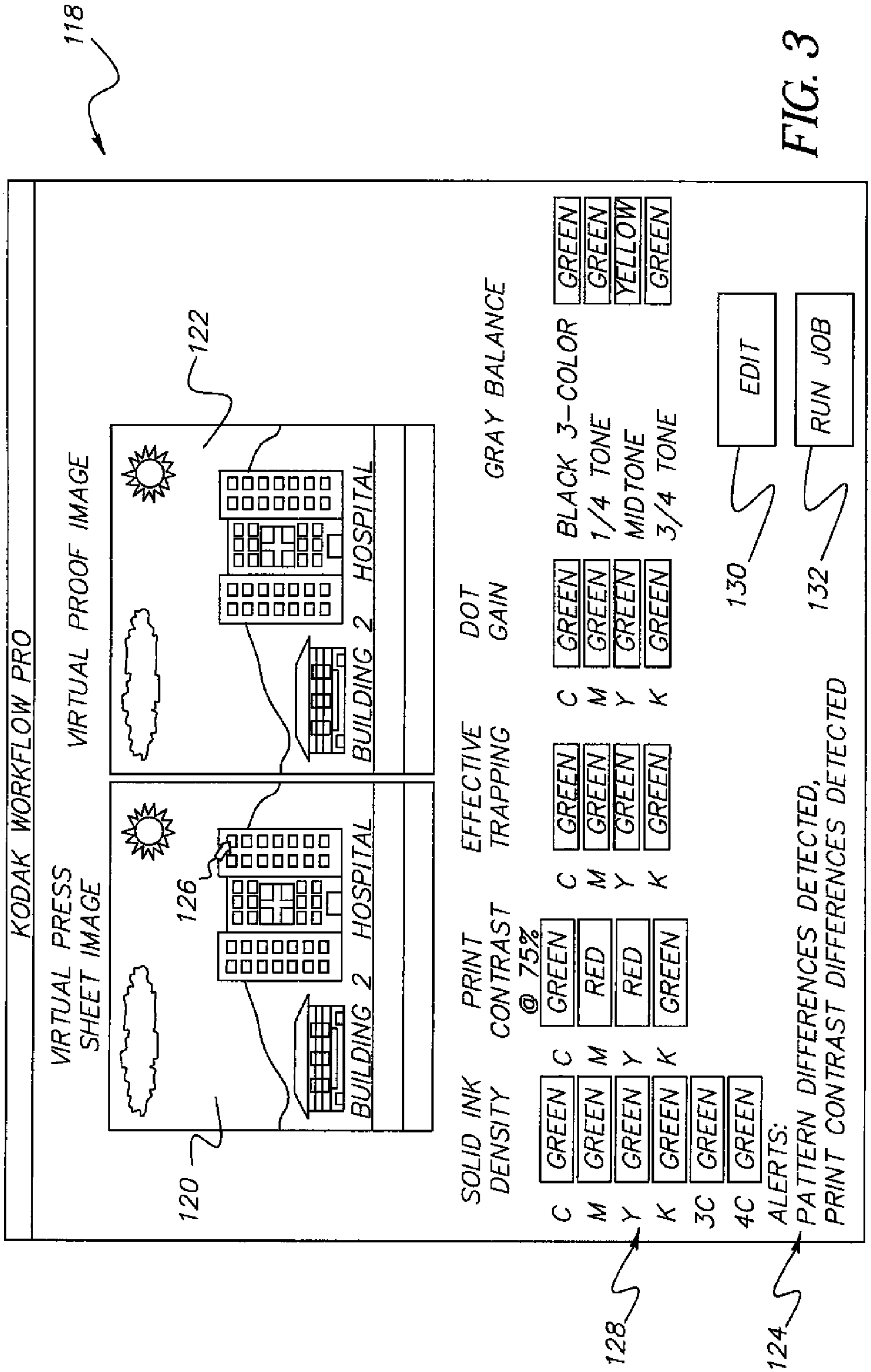
FIG. 3 shows one embodiment of a user interface.

FIG. 3 illustrates one embodiment of a side-by-side type user interface 118 presenting a display adapted virtual press sheet image 120 and a display adapted virtual proof image 122.

As shown in FIG. 3, difference information that helps a user to automatically detect differences between the press sheet image and the virtual proof image can be presented on the display to assist a user to better appreciate the differences between the virtual proof image and the virtual press sheet image when evaluating the virtual press sheet. In FIG. 3, user interface 118 presents the display adapted virtual press sheet image 120 and the display adapted virtual proof image 122 with such difference information taking the form of a textural warning 124 or a graphical warning 126. Additionally, other information 128 characterizing other potential areas of differences can be presented. Such information can be presented using graphic symbols, text, and markings on the virtual press sheet image, and/or the virtual press sheet so that detected differences can be highlighted for a user's consideration.

Thus, a client and/or a pressroom manager can review the quality of press sheet image 62 printed on receiver medium 24 without actually viewing press sheet 64 and can indicate whether the client and/or pressroom manager approves or requires changes (step 96). Such indications can be made electronically, by providing a remote user input system 58 at remote display 56 and a local user input system 68 at local display 66 that allows a user to make a response and cause a responsive signal to be transmitted to communication system 54 of printer 20. For example, as shown in FIG. 3, a user can select between an edit button 130 and a "run job" button 132. Such indications can also be made using any other means of communicating with printer 20 or with an operator of printer 20. Where the responsive signal contains an approval signal (step 102), the print job can be executed (step 104), and where a need for a revised printing setting is identified manually or automatically without an approval, revised printing settings can be determined automatically (steps 84 and 100) and printing settings for use in subsequent image prints can be adjusted according to the revised setting (step 100), and further causing the process of generating one or more press sheet(s), providing the one or more virtual press sheet(s) so that comparison, approval, input and adjustment can be conducted again as necessary.

It will be appreciated that using this approach, the remote user has an opportunity to view a virtual press sheet image that has been printed in accordance with each requested change. This approach is made feasible, convenient and reliable in the present invention by incorporation of image capture system 32 into printer 20 so that a virtual press sheet image can be captured of the entire press sheet almost immediately after printing of press sheet image 62.

As is noted above, the appearance of the press sheet image 62 on press sheet 64 can vary depending upon the interaction of print engine 22, receiver material 26 and any printing materials such as colorants, donors or other material transferred to receiver material 26 by print engine 22. However, the prior art approach of digitally simulating the effect of requested changes to a printed image fails to consider that such digital simulations do not compensate for the effects of such interaction, and thus the method described herein provides a more accurate representation of the effect of a requested change than the prior art which does not even suggest simulating such effects.

In certain embodiments of the invention, the virtual press sheet may be printed as a part of an initial subset of images intended to satisfy the print order. For example, where a print order comprises 2000 copies of a print, it may be more efficient to obtain a virtual press sheet from an initial batch of 500 images. Because image capture system 32 of the present invention is incorporated into printer 20 and is capable of scanning full pages, a set of virtual press sheet images can be obtained based upon one, some, or all of the initial batch of images.

Figure 4:
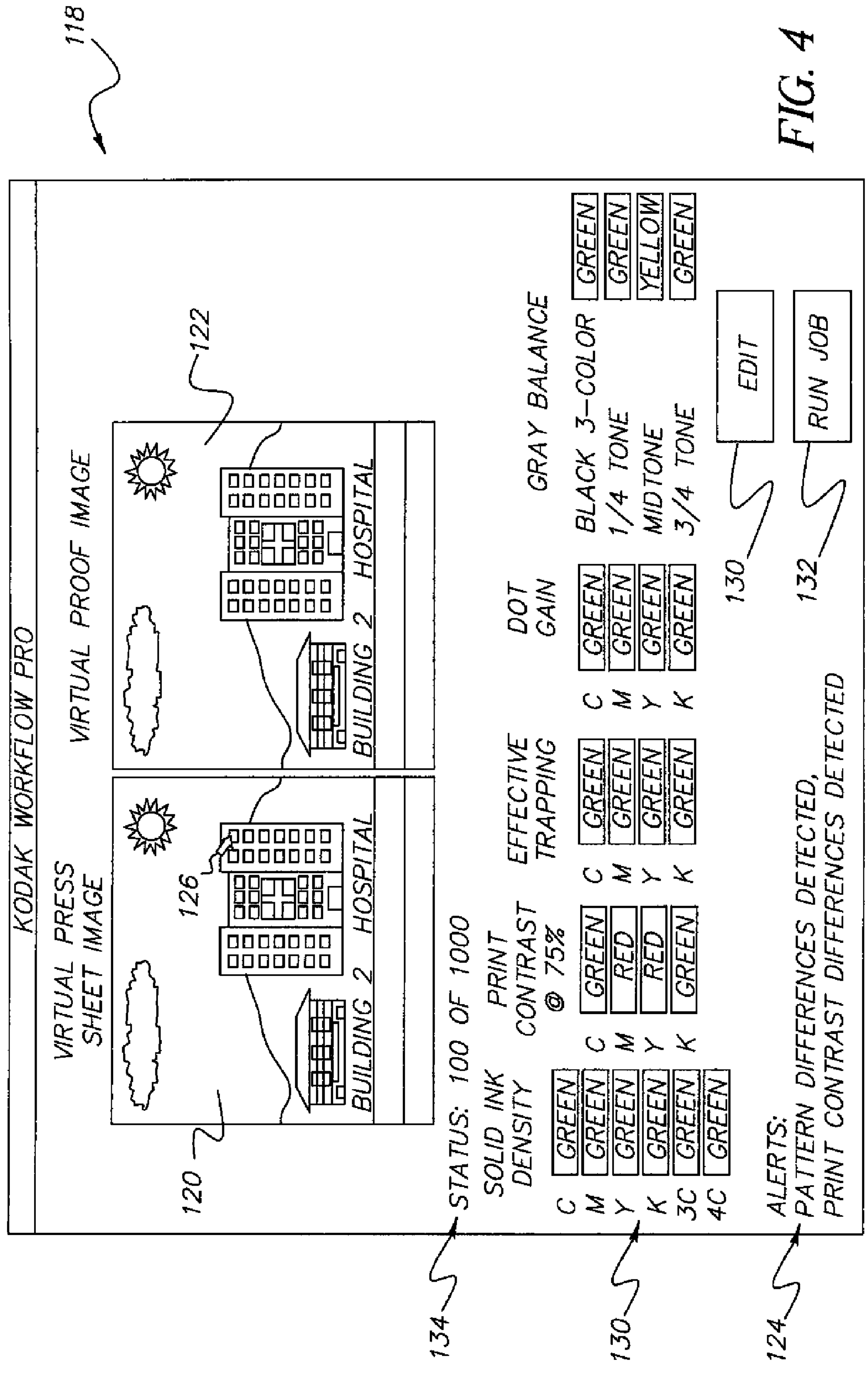
FIG. 4 shows another embodiment of a user interface.

Similarly, as illustrated in FIGS. 2 and 4, a user interface 118 can also be provided that presents display adapted virtual press sheet images of the images printed during the execution of the print order (step 106), so that steps 78-102 can be executed during execution of the print order for use in detecting differences that arise during execution of the order. A status indicator 134 indicates the point of the print order from which the currently presented display adapted virtual proof image 122 has been obtained.

Where this is done, the virtual press sheet images can be compared to the virtual proof to detect conditions that may vary during a print job. For example, where a serialized number of prints are printed, the quality and correctness of the serialization data and the quality of the printing of the same can be verified throughout the batch. Similarly, conditions that can vary during the printing of the print job, such as conditions that drift or that otherwise can vary over time can be detected.

As noted above, when a difference is detected by comparing the virtual press sheet image to a virtual proof image, the display of the virtual press sheet can be made in a manner that underscores the existence of the condition to a reviewer of the virtual press sheet. This can be done in a variety of ways such as by: presenting graphical information indicating the identified differences, such as text 126 shown in FIG. 4, or graphical information that indicate the nature of the condition, the location of the condition, and/or the extent of the condition as shown above in FIG. 4. In one embodiment, the indication can be selected from a predetermined set of graphical symbols used in manual image editing.

Figure 5:
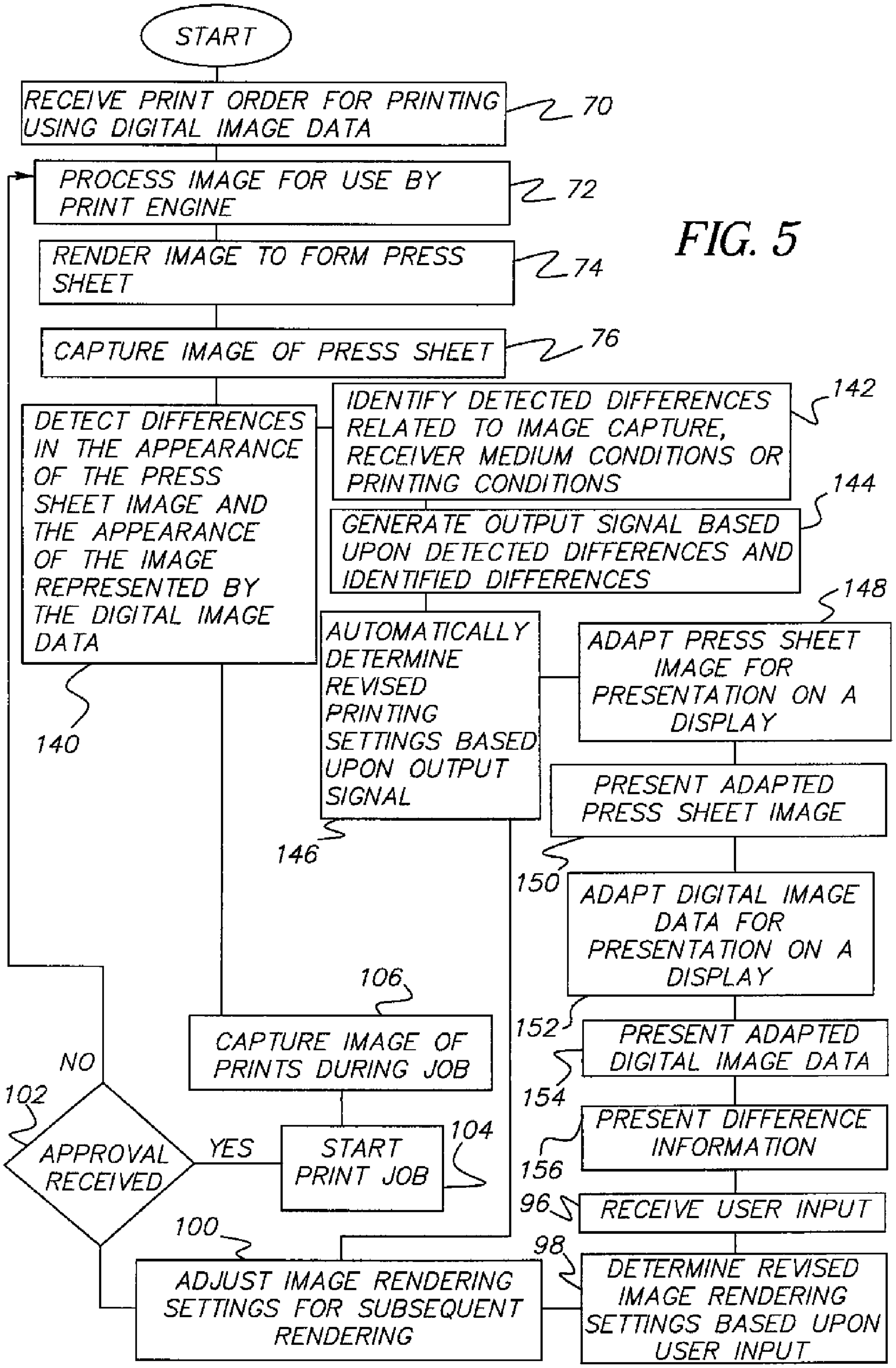
FIG. 5 shows a flow diagram of another embodiment of a method for operating a printer.

FIG. 5 shows another embodiment of a method for printing an image on a receiver medium 24 in accordance with the invention. In the embodiment of FIG. 5, a print order is received containing digital image data representing an image to be printed (step 70), the digital image data is processed for use by print engine 22 (step 72) and print engine 22 is used to print an image on the receiver medium based upon the digital image data and initial printing settings (step 74). A press sheet image is then captured of the image printed on the receiver medium (step 76).

In this embodiment, the press sheet image and the image represented by the digital image data are compared to detect differences between the appearance of the image represented by the digital image data and the appearance of the press sheet image (step 140). Such a comparison can be performed in a manner similar to that described above with respect to the step of comparing the virtual press sheet and the virtual proof (e.g. step 82).

It will be appreciated, however, that this comparison may detect differences that reflect the presence of image artifacts introduced by the process used to capture the press sheet image. Examples of detected differences that reflect the presence of an image artifact introduced by the process used to capture the press sheet image include those differences that are created by an artifact caused by image capture conditions used in capturing the press sheet image, characteristics of an image sensor used to capture the press sheet image, image processing of the captured press sheet image, or other characteristics of the process used to capture, process or store the press sheet image.

Similarly, such a comparison may also detect differences introduced by the way in which a properly operating print engine converts digital image data into a printed image on a reference receiver. Examples of such differences include differences that are introduced by a change in image resolution, image color content or image size that are not called for in the digital image data but necessary for the printer engine 22 to print the image.

Further, such comparisons may detect differences introduced by a difference in the way in which a particular type of receiver medium responds to printing by print engine 22 and the way in which the reference receiver medium reacts to the same printing by the print engine. Examples of this include differences caused by the texture of the receiver medium, a difference caused by the color of the receiver medium or a difference in the surface finish of the receiver medium.

Because these types of detected differences do not accurately reflect differences between the desired appearance of an image, as indicated by the digital image data and the actual appearance of the press sheet image printed by print engine 22 in on receiver medium 24, there is a need to ensure that such differences are not used as a basis for correcting the printing process or for determining whether to authorize execution of a print job.

In the embodiment of FIGS. 2-4, this is need is addressed by adapting the press sheet image to form a virtual press sheet image as described above and by forming a virtual proof using the digital image data as also described above and by performing the comparison step 82 using the virtual proof and virtual press sheet image. However, in the embodiment of FIG. 5, the comparison is performed without first forming the virtual proof and virtual press sheet images.

Accordingly, in the embodiment of FIG. 5, a further step of identifying detected differences that reflect the presence of an image artifact introduced by the process used to capture the press sheet image, any detected difference introduced by the way in which a properly operating print engine converts digital image data into a printed image on a reference receiver medium or any detected difference introduced by a difference in the way in which a particular type of receiver medium responds to printing by the print engine and the way in which the reference receiver medium reacts to the same printing by the print engine (step 142).

An output signal is then generated based upon the detected differences and the identified differences. This can be done in a variety of ways (step 144). The output signal can be generated to include detected differences other than the identified differences. The output signal can alternatively identify both the identified and detected differences. The output signal can also be used as a basis for generating a user perceptible signal that indicates which of the detected differences is among the identified differences.

In the embodiment shown, the output signal is also used for automatically determining revised printing settings (step 146). This can be done in a similar fashion to the step of automatically determining revised image printing settings described with reference to FIG. 2. It will be appreciated that, in this embodiment, however, the identified differences will be excluded from use in determining the revised image printing settings. Optionally the press sheet image can be presented to a user for review. This is done, in the embodiment of FIG. 5, by adapting the press sheet image for presentation on a display (step 148) which can be done in the manner described above in the embodiment of FIGS. 2-4 for adapting the a press sheet image. Further adaptations can be made to the press sheet image in order to exclude artifacts generated during the process of capturing or processing the image. The adapted press sheet image is then presented on a display (step 150).

Also optionally, the digital image data can be adapted for presentation on a display for user consideration (step 152) and can be presented thereon (step 151). These steps can also be performed in generally the same manner that is described above for adapting the virtual press sheet image for presentation. Difference information can then be presented to help an observer of a displayed press sheet image and/or a displayed image representing the digital image data to better appreciate the differences between the images. This information can be based upon the output signal and can comprise text or graphic information as is described above with respect to FIGS. 3 and 4. The remaining steps of the embodiment shown in FIG. 5 are also performed in the same manner described above with reference to the embodiment of FIGS. 2-4.

The invention has been described in detail with particular reference to certain preferred embodiments thereof, but it will be understood that variations and modifications can be effected within the spirit and scope of the invention.

PARTS LIST

20 printer
21 housing
22 print engine
24 receiver medium
26 media advance
28 motor
30 pinch rollers
32 image capture system
34 processor
36 user input system
38 sensors
40 memory
42 hard drive
44 removable disk drive
46 memory card slot
48 removable memory
50 memory interface
52 remote memory system
54 communication system
56 remote display device
58 remote user input system
62 printed image
64 press sheet
66 local display
68 local display user input system
70 receive print order step
72 convert step
74 print step
76 capture image step
78 adjust image step
80 form virtual proof step
82 compare step
84 revised image printing settings determining step
86 generate virtual proof image
88 present virtual press sheet image
90 adapt virtual proof step
92 present virtual proof step
94 present difference information step
96 receiver user input step
98 determine revised printing settings
100 adjust printing settings step 102 approval received step
104 start print job step
106 capture image step
118 user interface
120 display adapted virtual press sheet image
122 display adapted virtual proof image
124 textural warning
126 graphical warning
128 information
130 edit button
132 run job button
134 status indicator
140 compare step
142 detect differences step
144 generate output step
150 determine revised printing settings step
152 adapt press sheet image step
154 present adapted press sheet image step
156 present differences information step

The invention claimed is:

1. A method for printing an image on a receiver medium, the method comprising the steps of:

receiving digital image data representing an image to be printed;

using a print engine to print an image on the receiver medium based upon the digital image data and initial printing settings;

capturing a press sheet image of the image printed on the receiver medium;

generating a virtual press sheet image based upon the press sheet image said generating including the step of adapting the press sheet image to remove any artifacts induced by the manner in which the press sheet image is captured;

adjusting the digital image data to form a virtual proof image having an appearance that reflects the anticipated appearance of an image printed on the receiver medium by the print engine based upon the digital image data; and automatically comparing the appearance of the virtual press sheet image and the appearance of the virtual proof image to detect differences.

2. The method of claim 1, further comprising the steps of:

determining revised printing settings based upon the detected differences for use in subsequent prints made by the print engine; and automatically adjusting the operation of the print engine in accordance with the revised printing settings so that a subsequent printing by the print engine will be made in accordance with the revised printing settings.

3. The method of claim 2, wherein the step of determining revised printing settings comprises the steps of presenting difference information to a person indicating differences between the appearance of the virtual proof image and the appearance of the virtual press sheet image, receiving a response from that person and making said determination based upon the response.

4. The method of claim 3, wherein the step of presenting information to a person identifying the detected differences comprises presenting the virtual press sheet image on a display, said virtual press sheet being further adapted for presentation on the display by characterizing the way in which the display converts an image into a pattern of light and adapting the virtual press sheet image in accordance with said characterizing so that the virtual press sheet has an appearance when presented on the display that accurately represents the appearance of the image printed by the print engine on the receiver medium and wherein said difference information is presented in a visual form on the display concurrently with the presentation of the virtual press sheet image.

5. The method of claim 4, further comprising the steps of adapting the virtual proof image so that said virtual proof image has an appearance when presented on the display that reflects the anticipated appearance of an image printed on a receiver medium by the print engine to be used in printing the print based upon the digital image data and presenting the virtual proof image and the virtual press sheet on the display at substantially the same time so that at least some of the detected differences therebetween are visually identifiable to the person.

6. The method of claim 3, wherein said difference information comprises graphical information identifying at least some of the detected differences, said presented graphical information being selected from a predetermined set of graphical symbols used in manual image editing.

7. The method of claim 2, wherein said revised printing settings are determined so that said print engine can print a second image on the receiver medium based upon the digital image data, said second image having an appearance that more closely resembles the appearance of the virtual proof image.

8. The method of claim 1, wherein said comparing step comprises comparing color and print characteristics of the virtual press sheet image and the virtual proof image including at least some of the following: solid ink density (SID), dot gain, trapping, Lab data, hue, saturation, print contrast, and gray balance.

9. The method of claim 8, wherein said comparing step is performed with emphasis at selected areas of the virtual press sheet image and virtual proof image, said areas being determined manually or automatically based upon image content.

10. The method of claim 1, wherein said comparing step comprises comparing patterns formed in the virtual press sheet image to patterns formed in the virtual proof to detect differences that take the form of patterns found within the virtual press sheet image that are not present within the virtual proof image.

11. The method of claim 1, herein said comparing step comprises comparing patterns formed in the virtual press sheet image to similar patterns formed in the virtual proof and to determine whether any patterns found within the virtual press sheet vary from the same pattern found within the virtual proof as to at least one of the location, size, orientation, sharpness, or the smoothness of the edge.

12. A method for printing an image on a receiver medium, the method comprising the steps of:

receiving digital image data representing an image to be printed;

using a print engine to print an image on the receiver medium based upon the digital image data and initial printing settings;

capturing a press sheet image of the image printed on the receiver medium;

automatically comparing the press sheet image to the digital image data to detect differences between the appearance of the image represented by the digital image data and the appearance of the press sheet image;

identifying differences that reflect at least one of the presence of an image artifact introduced by the process used to capture the press sheet image, any detected difference introduced by the way in which a properly operating print engine converts digital image data into a printed image on a reference receiver medium or any detected difference introduced by a difference in the way in which a particular type of receiver medium responds to printing by the print engine and the way in which the reference receiver medium reacts to the same printing by the print engine; and generating an output signal based upon the detected differences and the identified differences.

13. The method of claim 12, wherein a detected difference reflects the presence of an image artifact introduced by the process used to capture the press sheet image comprises an artifact caused by image capture conditions used in capturing an image, characteristics of an image sensor used to capture the image, image processing of the captured image, or other characteristics of the image capture process.

14. The method of claim 12, wherein a detected difference introduced by the way in which a properly operating print engine converts the digital image data into a printed image on a reference receiver medium comprises a change in image resolution, image color content or image size.

15. The method of claim 12, wherein a detected difference introduced by a difference between the reference receiver medium and the actual receiver medium comprises at least one of a difference in the way in which a particular type of receiver medium responds to printing by the print engine and the way in which the reference receiver medium reacts to the same printing by the print engine comprises, a difference caused by the texture of the receiver medium, a difference caused by the color of the receiver medium or a difference in the surface finish of the receiver medium.

16. A system for printing images on a receiver medium comprising:

a print engine to print an image on the receiver medium based upon digital image data, said printing being performed in accordance with initial printing settings;

an image capture system adapted to capture a digital image of the receiver medium after an image has been printed thereon, and to generate captured image data reflecting the appearance of the image on the receiver medium;

a processor adapted to cause the print engine to print the image on the receiver medium, to cause the image capture system to capture an image of the press sheet, and to convert captured image data into a virtual press sheet image by adapting captured image data to remove any artifacts introduced by the image capture system;

a source of a virtual proof, said virtual proof being formed by adapting the digital image data to reflect known characteristics of the way in which the print engine converts digital image data into images to be formed on a receiver medium and by further adapting the digital image data to reflect known characteristics of a receiver medium upon which a press sheet is to be printed using the digital image data; and a comparator adapted to compare the appearance of the virtual press sheet image and the appearance of the virtual proof image to detect differences therebetween.

17. The system of claim 16, wherein said processor is further adapted to determine any revised printing settings and to automatically adjust the operation of the print engine in accordance therewith for subsequent printings by the print engine.

18. The system of claim 16, further comprising:

a presentation system adapted to present an output in human detectable form that identifies the existence of any detected differences; and a user input system adapted to receive a user input by which a user can provide input that the processor can determine said revised printing settings.

19. The system of claim 18, wherein said processor is further adapted to present the virtual press sheet image on a display by characterizing the way in which the display converts an image into light and adapting the virtual press sheet image in accordance with the characteristics so that the virtual press sheet image has an appearance, when presented on the display, that accurately represents the appearance of the press sheet, and wherein said processor presents visual indications identifying areas of the virtual proof having detected differences in context with the presentation of the virtual proof image.

20. The system of claim 16, wherein the processor is further adapted to cause the display to present graphical symbols indicating the identified differences.

* * * * *